United States Patent
Liu (10) Patent No.: US 8,651,437 B2
(45) Date of Patent: Feb. 18, 2014

(54) PIVOTING ASSEMBLY WITH POSITIONING FUNCTION

(75) Inventor: Tsung-Cheng Liu, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 370 days.

(21) Appl. No.: 13/106,010

(22) Filed: May 12, 2011

(65) Prior Publication Data

US 2012/0153789 A1 Jun. 21, 2012

(30) Foreign Application Priority Data

Dec. 21, 2010 (TW) .............................. 99144895 A (51) Int. Cl.
*A47F 5/02* (2006.01)

(52) U.S. Cl.
USPC .............................. 248/130; 403/84; 403/330

(58) Field of Classification Search
USPC ........... 403/38, 39, 52, 79, 83, 84, 92, 93, 96, 403/97, 103, 104, 106, 107, 113, 119–120, 403/330; 248/130, 292.12, 346.04, 917, 248/919, 920, 922, 923; 16/319, 321, 327, 16/332, 334, 337, 341, 342, 352, 354; 81/177.7, 177.8
See application file for complete search history.

(56) References Cited

U.S. PATENT DOCUMENTS

| | | | | |
|---|---|---|---|---|
| 2,977,824 A | * | 4/1961 | Rueb ................................ | 76/114 |
| 4,880,191 A | * | 11/1989 | Lake, Jr. ........................ | 248/371 |
| 5,168,423 A | * | 12/1992 | Ohgami et al. .......... | 361/679.07 |
| 5,632,463 A | | 5/1997 | Sung et al. | |
| 5,931,440 A | * | 8/1999 | Miller ........................... | 248/549 |
| 6,007,038 A | * | 12/1999 | Han .............................. | 248/371 |
| 6,079,683 A | * | 6/2000 | Lin .......................... | 248/292.12 |
| 6,089,520 A | * | 7/2000 | Wu et al. ...................... | 248/371 |
| 6,216,567 B1 | * | 4/2001 | Hu ................................ | 81/177.9 |
| 6,295,898 B1 | * | 10/2001 | Hsieh ........................... | 81/177.8 |
| 6,517,040 B1 | * | 2/2003 | Wen ........................... | 248/278.1 |
| 6,532,628 B2 | * | 3/2003 | Kim ............................... | 16/342 |
| 6,745,650 B1 | * | 6/2004 | Chang .......................... | 81/177.8 |
| 6,869,056 B2 | * | 3/2005 | Tsukuda ...................... | 248/371 |
| 7,146,886 B1 | * | 12/2006 | Wu .............................. | 81/177.8 |
| 7,171,875 B2 | * | 2/2007 | Hu .............................. | 81/177.8 |
| 7,301,759 B2 | * | 11/2007 | Hsiung ................... | 361/679.27 |

(Continued)

FOREIGN PATENT DOCUMENTS

CN 2188550 Y 2/1995

OTHER PUBLICATIONS

China Official Action issued on Jul. 2, 2013.

*Primary Examiner* — Gregory Binda
*Assistant Examiner* — Nahid Amiri
(74) *Attorney, Agent, or Firm* — Chun-Ming Shih; HDLS IPR Services (57) ABSTRACT

A pivoting assembly with a positioning function includes a base and a casing assembled with the base. The base is provided with curved elastic arms and two fixing supports. Each fixing support has a pivotal hole. One surface of the casing is formed with a curved portion for allowing the curved elastic arm to abut against and two holes for allowing the fixing support to pass through. The other surface of the casing is formed with a protrusion pivotally connected to the pivotal hole. When the curved portion slides on the curved elastic arm, elastic abutment between the curved portion and the curved elastic arm makes the casing to be positioned by friction fit with respect to the base.

8 Claims, 10 Drawing Sheets

(56) References Cited

U.S. PATENT DOCUMENTS

| | | | |
|---|---|---|---|
| 7,461,826 B2 * | 12/2008 | Carnevali | 248/292.12 |
| 7,472,631 B1 * | 1/2009 | Wu | 81/177.9 |
| 7,540,463 B2 * | 6/2009 | Tsuboi | 248/393 |
| 7,571,883 B2 * | 8/2009 | Van Groesen et al. | 248/282.1 |
| 7,604,276 B2 * | 10/2009 | Vitito | 296/37.8 |

\* cited by examiner

PIVOTING ASSEMBLY WITH POSITIONING FUNCTION

BACKGROUND OF THE INVENTION

1. Field of the Invention

The present invention relates to a pivoting assembly, and in particular to a pivoting assembly with a positioning function.

2. Description of Prior Art

A pivoting assembly is provided in various devices, whereby the device can pivotally rotate to a desired angle. For example, a common desktop liquid crystal display includes a support, a monitor and a pivoting assembly provided between the support and the monitor. The pivoting assembly is constituted of a base and a casing. The base and the casing are respectively provided with a shaft hole corresponding to each other. A positioning pin or bolt is disposed through the shaft holes and fixed thereto, thereby fixing the base and the casing. By this structure, the casing may pivotally rotate with respect to the base and be positioned at a desired angle.

However, such a conventional pivoting assembly has to be provided between the casing and the base for easy repair, which inevitably increases the distance between the casing and the base. As a result, such a pivoting assembly cannot be made more compact. Further, the positioning pin or bolt undesirably increases the number of components and the production cost.

Therefore, it is an important issue for the present Inventor to solve the above-mentioned problems.

SUMMARY OF THE INVENTION

The present invention is to provide a pivoting assembly with a positioning function, whereby pivotal connection and angle adjustment can be achieved without using a positioning pin or bolt. Thus, the present invention is simple in structure, easy to assemble, and low in production cost.

The present invention relates to a pivoting assembly with a positioning function, including:

a base provided with at least one curved elastic arm and two fixing supports located on both sides of the at least one curved elastic arm, each of the fixing supports being provided with a pivotal hole; and a casing assembled with the base, the casing being formed with a curved portion for allowing the at least one curved elastic arm to abut against, and two protrusions pivotally connected to the pivotal holes respectively;

wherein elastic abutment between the curved portion and the curved elastic arm makes the casing to be positioned by friction fit with respect to the base when the curved portion slides on the curved elastic arm.

According to another feature of the present invention, the curved elastic arm of the base and the curved portion of the casing are respectively formed with teeth engaged with each other to thereby increase the degree of friction fit between the base and the casing.

In comparison with prior art, the present invention has the following advantageous features.

Since the protrusion of the casing is pivotally connected to the pivotal hole of the base, it is unnecessary to use a positioning pin or bolt for fixing the casing and the base, thereby reducing the number of components and production cost. Further, the present invention is easy to assemble.

Since the curve surface of the casing elastically abuts against the curved elastic arm of the base, the connecting portion between the protrusion and the fixing support is located in the casing, so that the distance between the base and the casing is reduced for compact design.

Since the curved elastic arm of the base and the curved portion of the casing are respectively provided with teeth engaged with each other, the friction fit between the casing and the base is enhanced to generate a positioning function. Furthermore, the elastic abutment between the curved elastic arm and the curved portion also contributes to the positioning function of the present invention.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
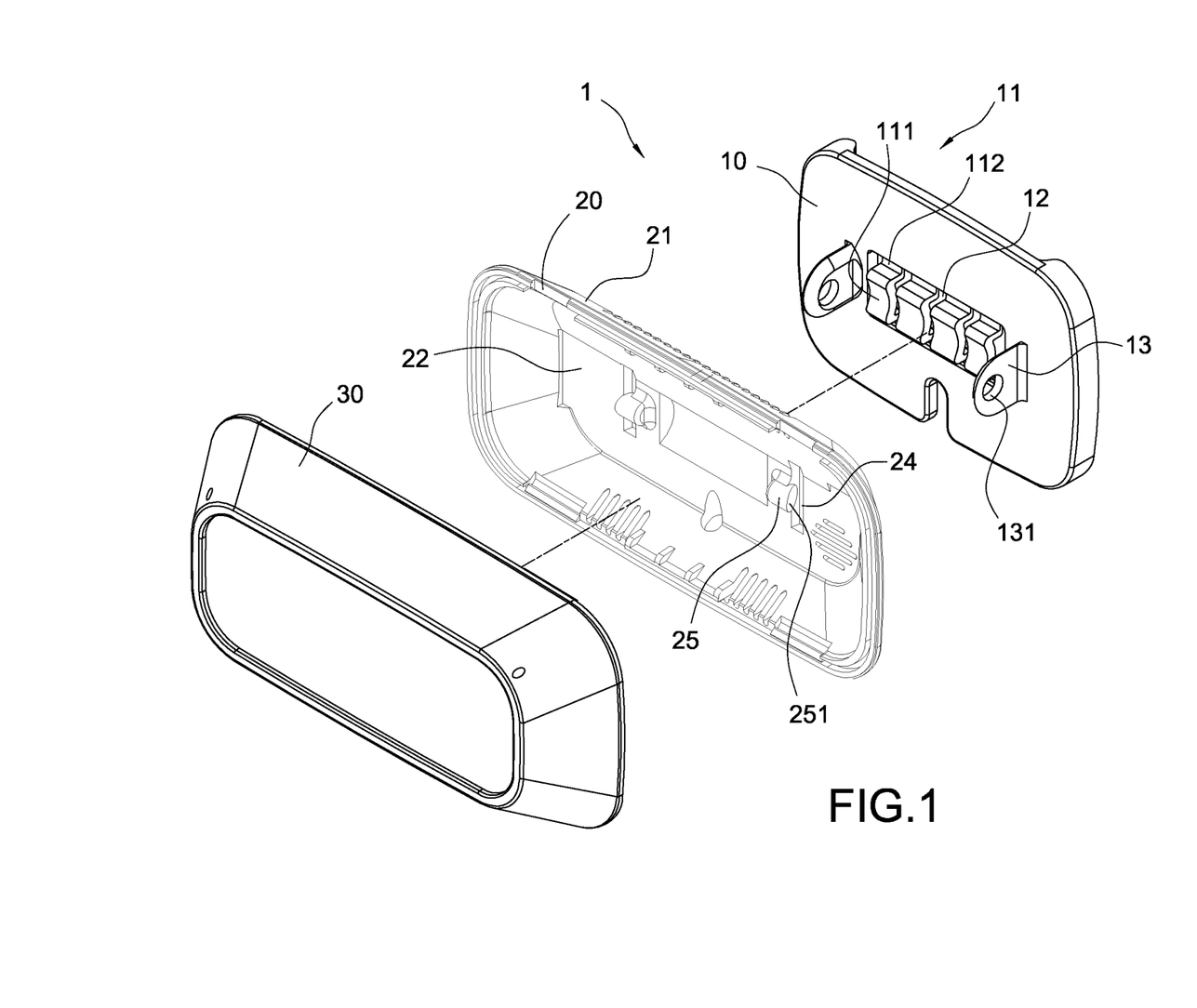
FIG. 1 is an exploded perspective view of the present invention.
Figure 2:
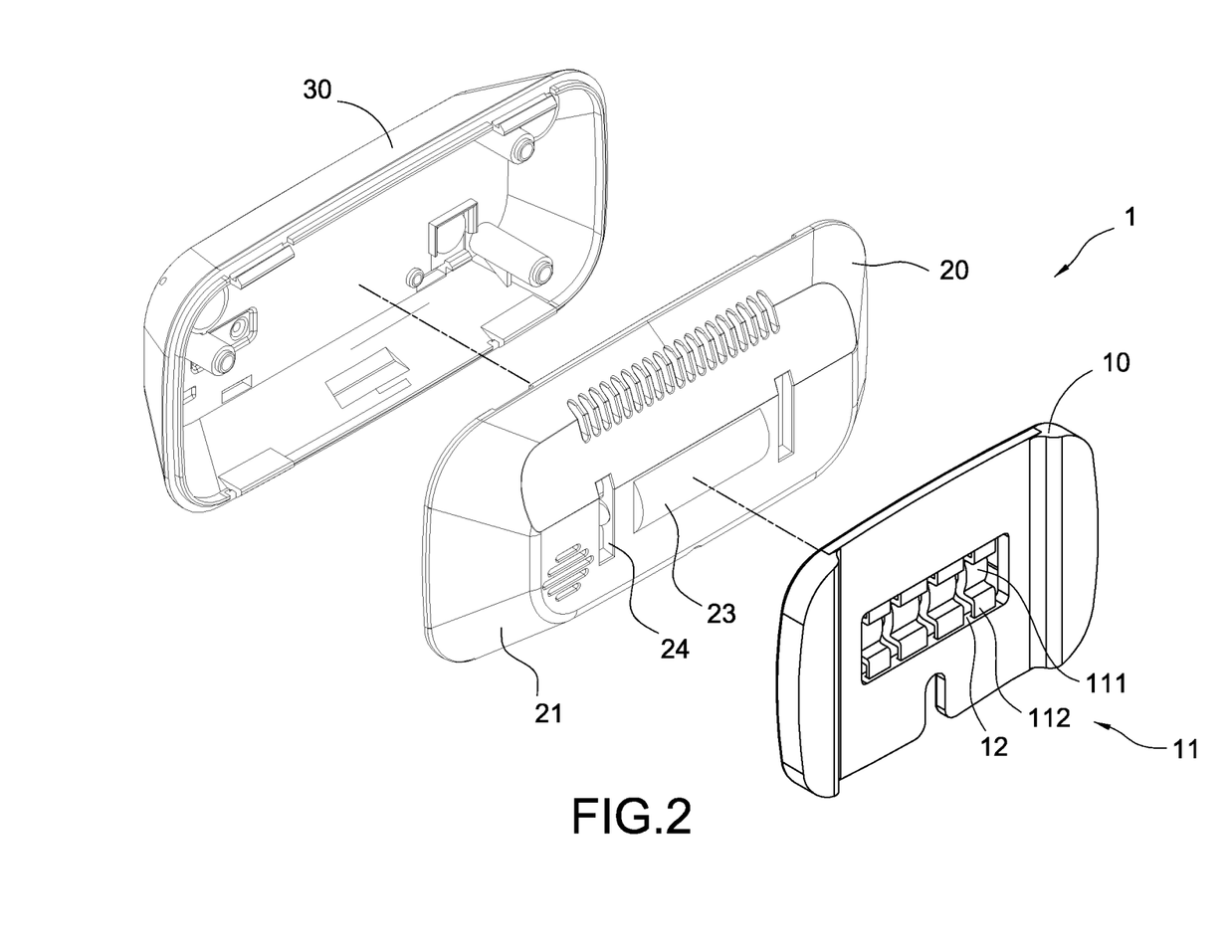
FIG. 2 is an exploded perspective view of the present invention taken from another viewing angle.
Figure 3:
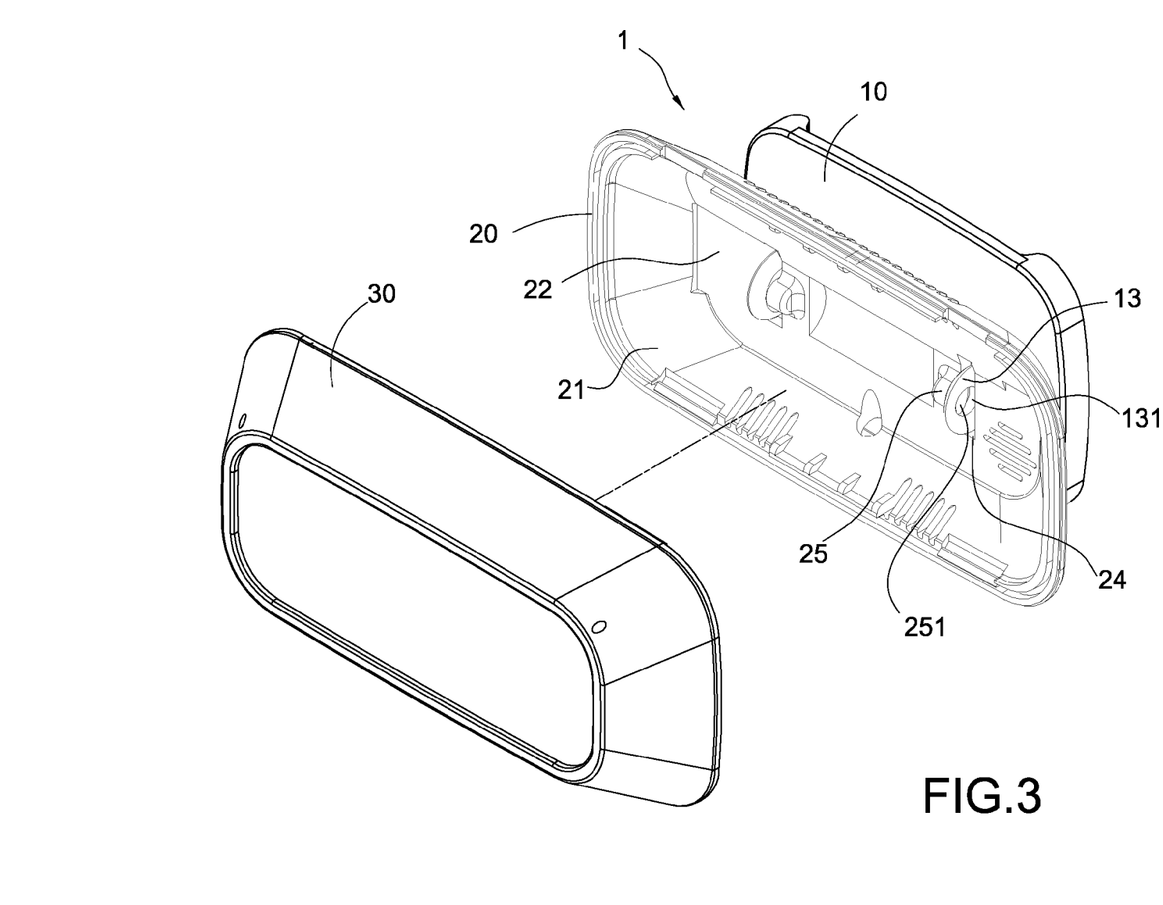
FIG. 3 is an assembled perspective view of the present invention.

Please refer to FIGS. 1 to 3. The present invention provides a pivoting assembly 1 with a positioning function, which includes a base 10 and a casing 20.

The base 10 is molded by plastic materials. Preferably, the base 10 is made by wear-resistant materials such as nylon, polyoxymethylene or polycarbonate. The base 10 is formed into a plate with its one surface having at least one curved elastic arm 11. As shown in FIG. 1, the base 10 is provided with four curved elastic arms 11. Each of the curved elastic arms 11 has a curved concave surface 111 and two connecting sections located on both sides of the curved concave surface 111 to connect the base 10. Both sides of each curved elastic arm 11 are provided with a groove 12, thereby increasing the degree of elastic deformation of the curved elastic arm 11. Both sides of the four curved elastic arms 11 are formed with two fixing supports 13 respectively. Each of the fixing supports 13 is provided with a pivotal hole 131 near its free end.

The casing 20 is also made of plastic materials. Preferably, the casing 20 is made by wear-resistant materials such as nylon, polyoxymethylene or polycarbonate. The casing 20 is assembled with the base 10. The casing 20 has a first surface 21 adjacent to the base 10 and a second surface 22 opposite to the first surface 21. The first surface 21 is formed with a curved portion 23 for allowing the curved elastic arm 11 to abut against. As shown in FIG. 2, the curved portion 23 is a semi-circular ridge to correspond to the curved concave surface 111 of the curved elastic arm 11.

Figure 4:
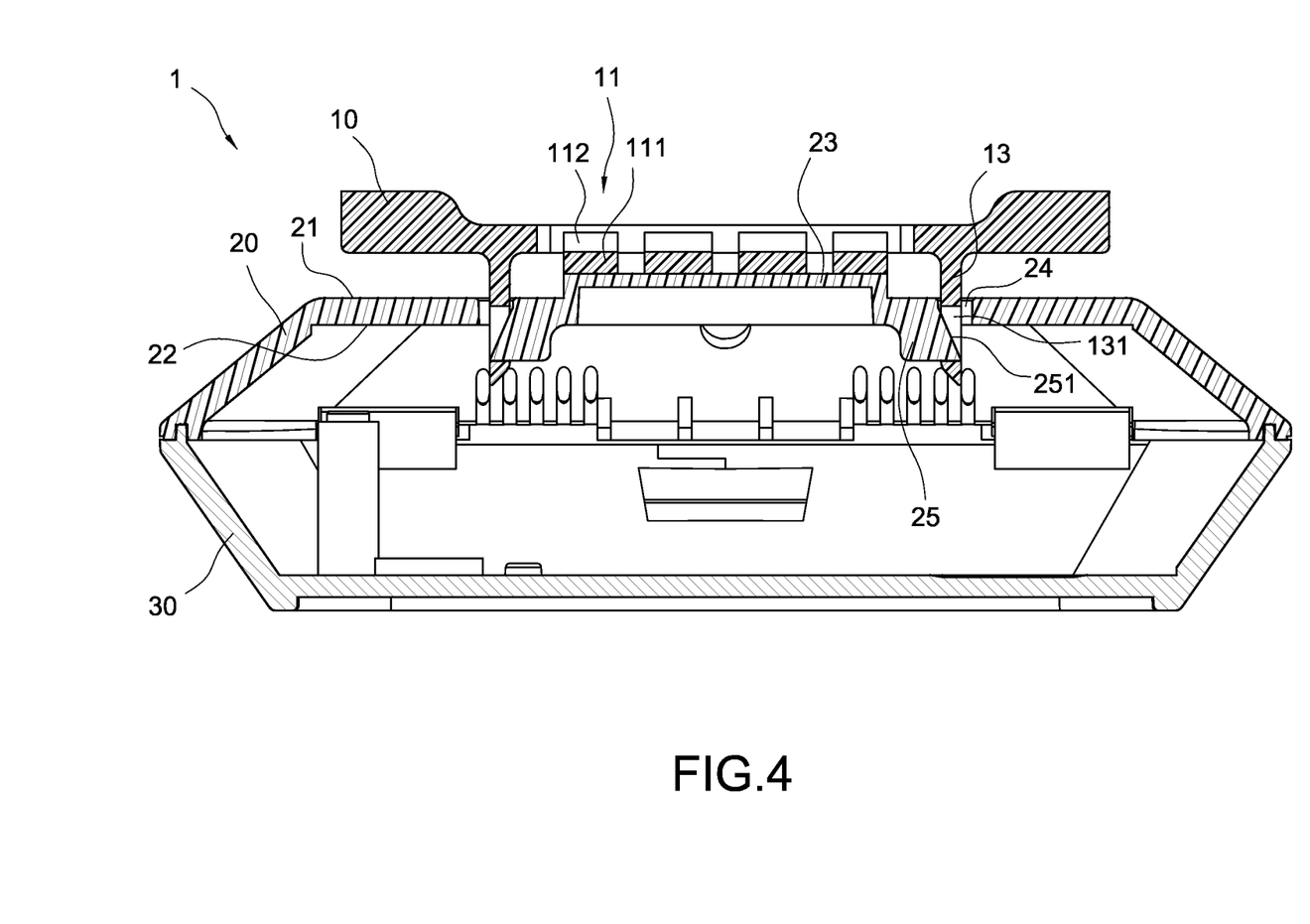
FIG. 4 is an assembled cross-sectional view of the present invention.

The first surface 21 of the casing 20 is provided on both sides of the curved portion 23 with two holes 24 for allowing the two fixing supports 13 to be disposed through. The second surface 22 is formed with two protrusions 25 for pivotally connecting the two fixing supports 13. The distal end of the protrusion 25 is formed with an engaging slope 251 to be engaged with the pivotal hole 131. As shown in FIG. 4, each of the protrusion 25 protrudes from the second surface 22 of the casing 20. The distal end of the protrusion 25 is not planar, but it is formed into a slope gradually widening away from the free end of the fixing support 13. This slope 251 helps the pivotal hole 131 of the fixing support 13 to slide thereon, so that the protrusion 25 can be inserted into the pivotal hole 131 easily. As a result, the casing 20 can be assembled with the base 10 easily. The user or repairer has to inwardly press the protrusion 25 from the outside of the two pivotal holes 131, thereby removing the engaging slopes 251 from the pivotal holes 131. Alternatively, the user or repairer may pull the free end of the fixing support 13 away from the protrusion 25, thereby separating the protrusion 25 from the fixing support 13. In this way, the casing 20 can be separated from the base 10.

Figure 5:
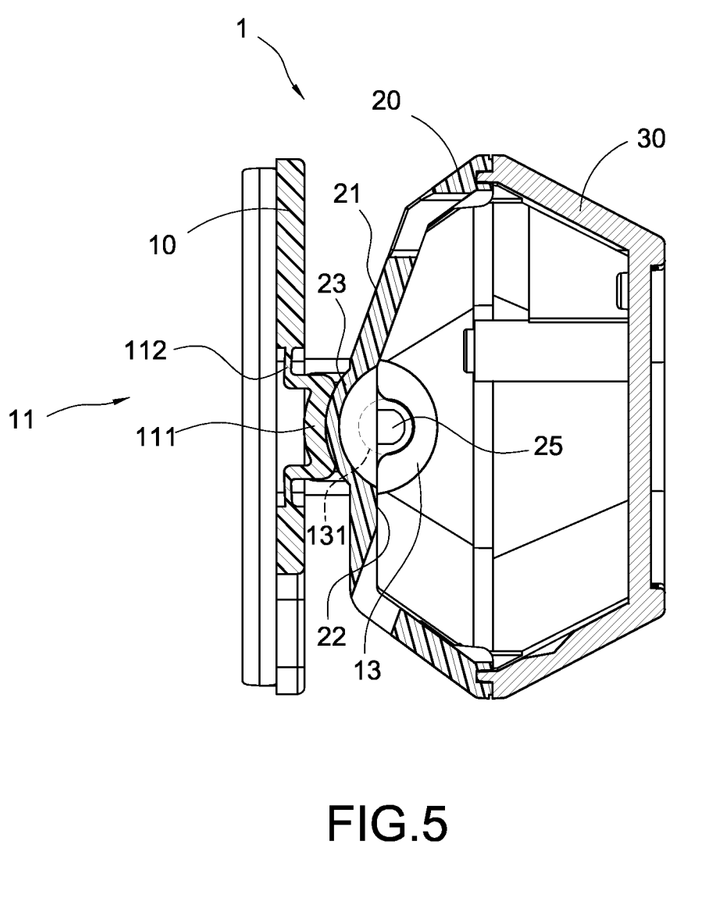
FIG. 5 is an assembled cross-sectional view of the present invention taken from another viewing angle.
Figure 6:
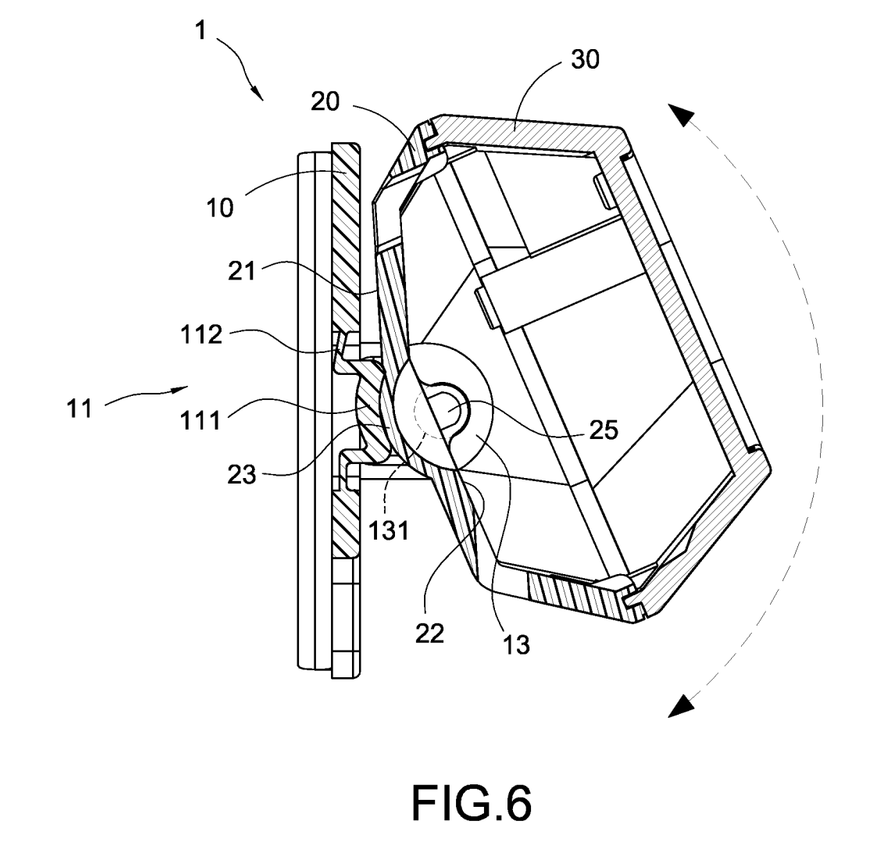
FIG. 6 is an assembled cross-sectional view of the present invention showing that the casing pivotally rotates upwardly or downwardly with respect to the base.

Please refer to FIG. 5. One side of the base 10 away from the casing 20 may be connected to a supporting leg (not shown) such as a supporting leg of a liquid crystal display for erecting on a table. One side of the casing 20 away from the base 10 is assembled with a connecting plate 30. The connecting plate 30 is assembled with a monitor of the liquid crystal display. As shown in FIG. 6, when the curved portion 23 of the casing 20 pivotally rotates upwardly or downwardly along the curved elastic arm 11, the elastic abutment between the curved portion 23 and the curved elastic arm 11 makes the casing 20 to be stopped at a desired position with respect to the base 10, thereby generating a positioning effect. Of course, the pivoting assembly 1 of the present invention may be applied to other devices. For example, the pivoting assembly 1 may be used to a suspension camera or surveillance camera (such as WEP/IP cam) provided in streets or buildings, a pivotal support for supporting an electronic device such as a personal digital assistant (PDA) or touch pad, or a pivoting assembly provided on a head of an electric fan. At this time, one side of the base 10 away from the casing 20 is mounted onto a wall. Further, in the embodiment of FIG. 1, although the profile of the connecting plate 30 is made to be engaged with the casing 20, the connecting plate 30 may be made to be larger than that of the casing 20, so that screws can be fixed onto the casing 20.

Figure 7:
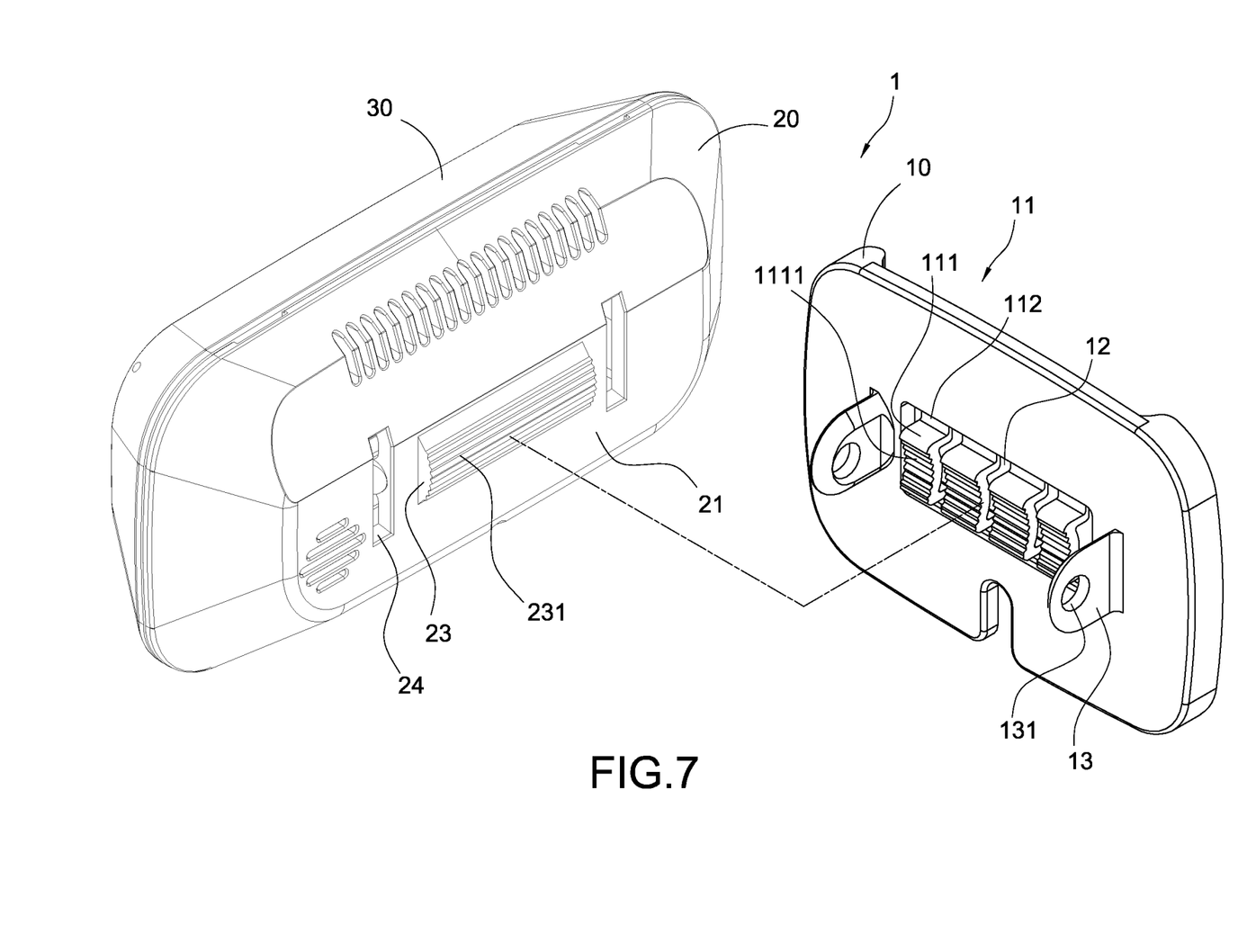
FIG. 7 is an exploded perspective view showing a second embodiment of the present invention.
Figure 8:
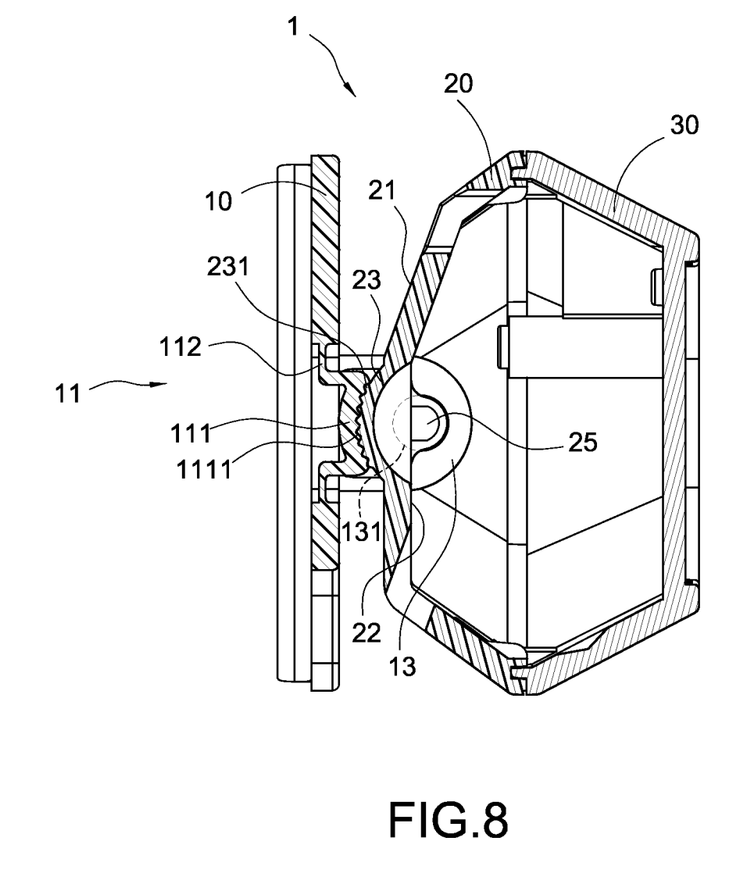
FIG. 8 is an assembled cross-sectional view showing the second embodiment of the present invention.
Figure 9:
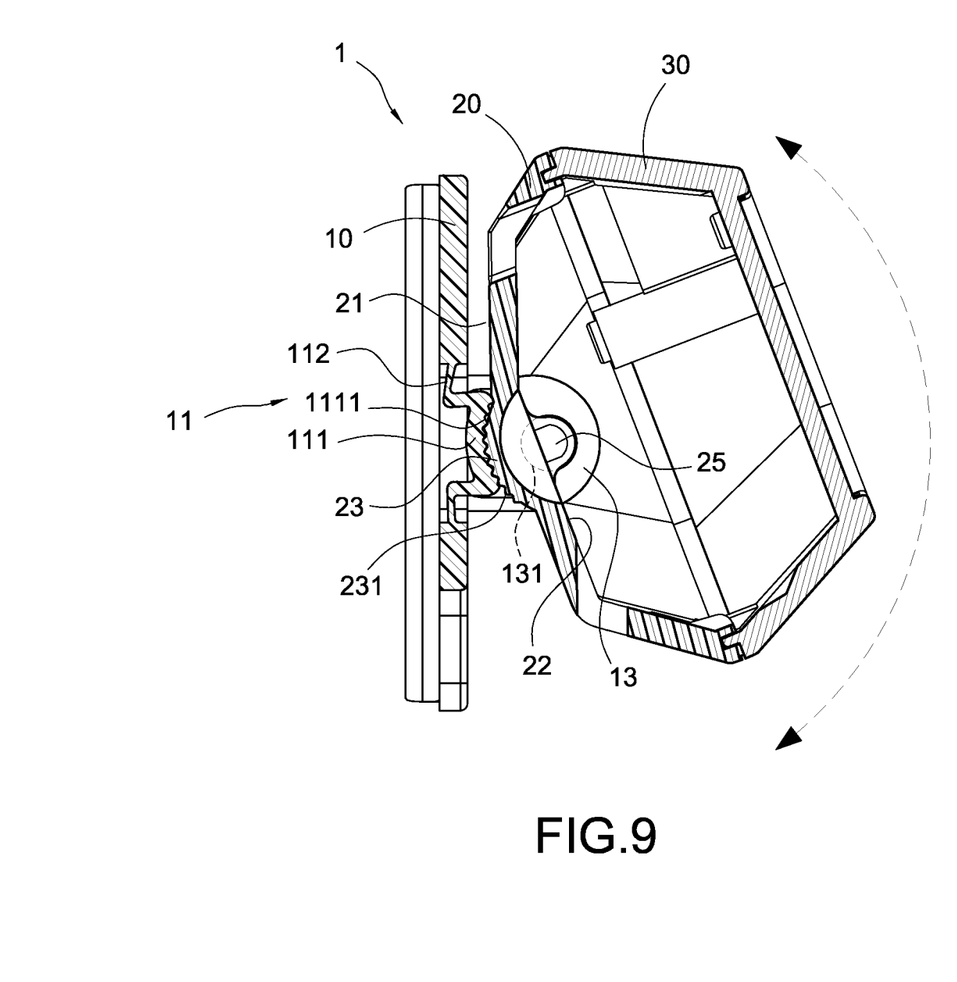
FIG. 9 is an assembled cross-sectional view of the second embodiment of the present invention showing that the casing pivotally rotates upwardly or downwardly with respect to the base.

Please refer to FIGS. 7 and 9, which show the second embodiment of the present embodiment. The structure of the second embodiment is substantially the same as that of the first embodiment. The difference between the second embodiment and the first embodiment lies in that: the curved elastic arm 11 of the base 10 and the curved portion 23 of the casing 20 are respectively provided with teeth 1111 and 231, thereby increasing the friction fit between the base 10 and the casing 20. By this structure, the positioning stability of the present invention is increased.

Figure 10:
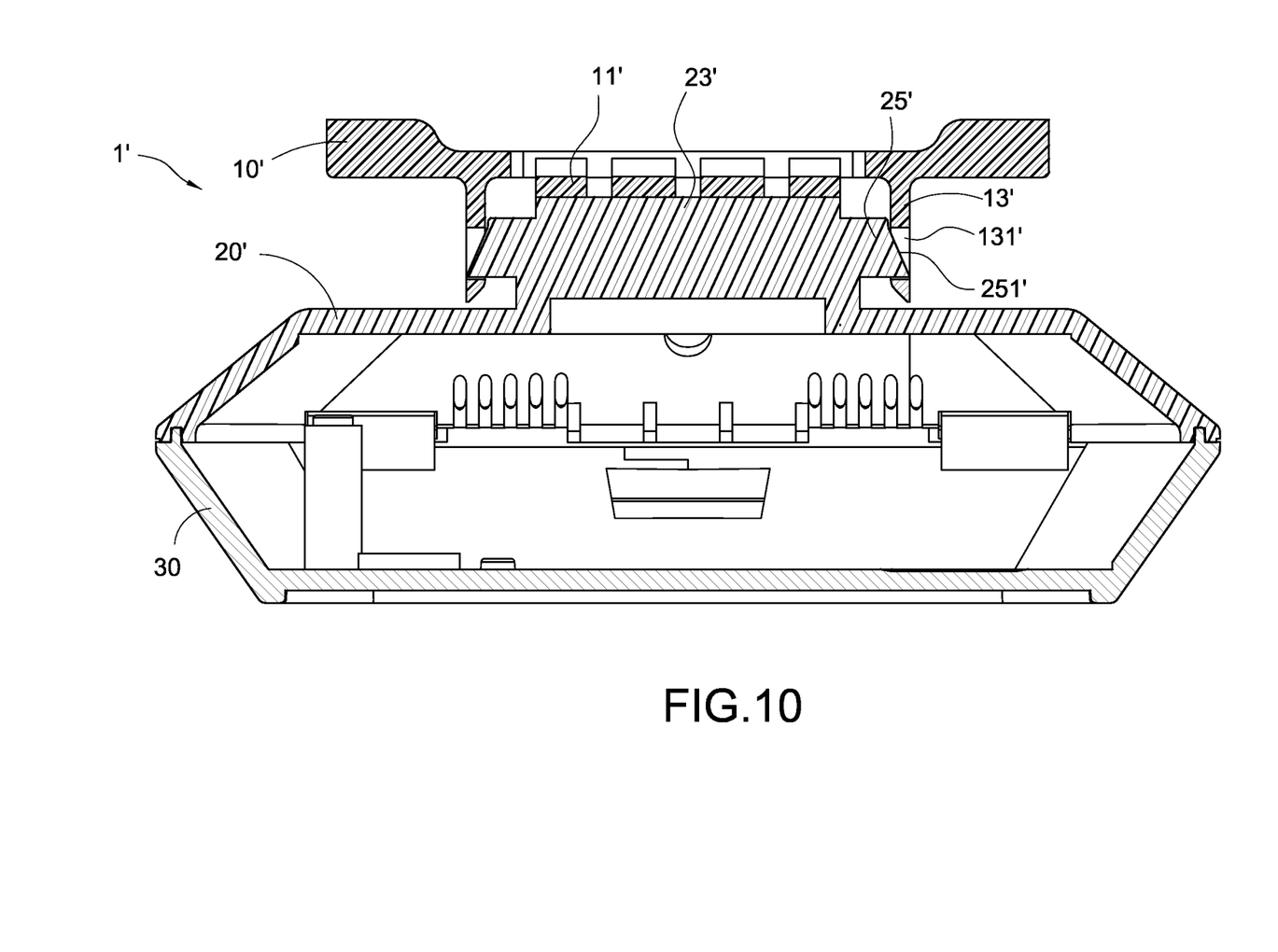
FIG. 10 is an assembled cross-sectional view showing a third embodiment of the present invention.

Please refer to FIG. 10, which shows the third embodiment of the present embodiment. The pivoting assembly 1' of the third embodiment is substantially the same as the pivoting assembly 1 of the first embodiment. The difference between the third embodiment and the first embodiment lies in that: the protrusion 25' of the casing 20' is not formed on one surface away from the base 10', but is formed on both sides of the curved portion 23'. Thus, the fixing support 13' of the base 10' can be directly engaged with the protrusions 25' on both sides of the curved portion 23' without passing through the casing 20'. Such a structure has an advantage of easy repair because the protrusion 25' and the fixing support 13' can be seen between the casing 20' and the base 10'. Thus, the repairer can separate the casing 20' from the base 10' without detaching the connecting plate 30.

As shown in FIG. 10, like the first embodiment, the distal end of each protrusion 25' is not planar, but it is formed into a slope 251' gradually widening away from the free end of the fixing support 13'. This slope 251' helps the pivotal hole 131' of the fixing support 13' to slide thereon, so that the protrusion 25' can be inserted into the pivotal hole 131' easily. As a result, the casing 20' can be assembled with the base 10' easily. The user or repairer has to inwardly press the protrusion 25' from the outside of the two pivotal holes 131', thereby removing the engaging slopes 251' from the pivotal holes 131'. Alternatively, the user or repairer may pull the free end of the fixing support 13' away from the protrusion 25', thereby separating the protrusion 25' from the fixing support 13'. In this way, the casing 20' can be separated from the base 10'.

As for the curved elastic arm 11' of the base 10' and the curved portion 23' of the casing 20', either the smooth curved surface shown in the first embodiment or the toothed curved surface shown in the second embodiment can be selected. In the third embodiment, in order to reduce the distance between the base 10' and the casing 20', the curved portion 23' is made to be recessed into the casing 20' (not shown), thereby achieving the same effect as that of the first embodiment.

In the above embodiments, although the curved elastic arm 11 of the base 10 has a curved concave surface, and the curved portion 23 of the casing 20 has a convex surface, those skilled in this art can easily consider to exchange the above structures with each other. That is, the curved elastic arm 11 of the base 10 has a convex surface, and the curved portion 23 of the casing 20 has a curved concave surface as long as the curved portion 23 can abut against the curved elastic arm 11.

In comparison with prior art, the present invention has the following advantageous features.

Since the protrusion 25 of the casing 20 is pivotally connected to the pivotal hole 131 of the base 10, it is unnecessary to use a positioning pin or bolt for fixing the casing 20 and the base 10, thereby reducing the number of components and production cost. Further, the present invention is easy to assemble.

Since the curve surface 23 of the casing 20 elastically abuts against the curved elastic arm 11 of the base 10, the connecting portion between the protrusion 25 and the fixing support 13 can be located in the casing 20, so that the distance between the base 10 and the casing 20 can be reduced for compact design.

Since the curved elastic arm 11 of the base 10 and the curved portion 23 of the casing 20 are respectively provided with teeth 1111 and 231 engaged with each other, the friction fit between the casing 20 and the base 10 is enhanced to generate a positioning function. Furthermore, the elastic abutment between the curved elastic arm 11 and the curved portion 23 also contributes to the positioning function of the present invention.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A pivoting assembly with a positioning function, including:
   a base provided with at least two curved elastic arms and two fixing supports respectively located on both sides of the at least two curved elastic arms, each of the fixing supports being provided with a pivotal hole; and
   a casing assembled with the base, the casing being formed with a curved portion for allowing the at least one curved elastic arm to abut against, and two protrusions pivotally connected to the pivotal holes respectively;
   wherein elastic abutment between the curved portion and the at least two curved elastic arms makes the casing to be positioned by friction fit with respect to the base when the curved portion slides on the at least two curved elastic arms,
   wherein each curved elastic arm has a curved concave surface and two connecting sections located on both ends of the curved concave surface to connect the base, and a groove is formed between the at least two curved elastic arms to increase the degree of elastic deformation of the at least two curved elastic arms, and
   wherein the casing has a first surface adjacent to the base and a second surface opposite to the first surface, the curved portion is formed on the first surface, two holes are respectively adjacent to both sides of the curved portion for allowing the two fixing supports to be disposed through, and the two protrusions are formed on the second surface.

2. The pivoting assembly with a positioning function according to claim 1, wherein the curved portion is a semi-circular ridge to correspond to the curved concave surface of the curved elastic arm.

3. The pivoting assembly with a positioning function according to claim 2, wherein each of the protrusions protrudes from the second surface, a distal end of each protrusion is formed with an engaging slope to be engaged with the pivotal hole, the engaging slope is a slope gradually widening away from a free end of the fixing support.

4. The pivoting assembly with a positioning function according to claim 3, wherein the curved elastic arm of the base and the curved portion of the casing are respectively provided with teeth engaged with each other, thereby increasing the friction fit between the base and the casing.

5. The pivoting assembly with a positioning function according to claim 1, wherein the casing has a first surface adjacent to the base and a second surface opposite to the first surface, the curved portion is formed on the first surface, the protrusion is integrally formed on both sides of the curved portion.

6. The pivoting assembly with a positioning function according to claim 5, wherein the curved portion is a semi-circular ridge to correspond to the curved concave surface of the curved elastic arm.

7. The pivoting assembly with a positioning function according to claim 6, wherein a distal end of each protrusion is formed with an engaging slope to be engaged with the pivotal hole, the engaging slope is a slope gradually widening away from a free end of the fixing support.

8. The pivoting assembly with a positioning function according to claim 7, wherein the curved elastic arm of the base and the curved portion of the casing are respectively provided with teeth engaged with each other, thereby increasing the friction fit between the base and the casing.

* * * * *